United States Patent
Stepps et al.

(10) Patent No.: US 9,055,630 B1
(45) Date of Patent: *Jun. 9, 2015

(54) POWER CONTROL SYSTEM AND METHOD FOR PROVIDING AN OPTIMAL POWER LEVEL TO A DESIGNATED LIGHT ASSEMBLY

(71) Applicants: Dale B. Stepps, Fort Lauderdale, FL (US); Jose Luis Suarez, Pembroke Pines, FL (US)

(72) Inventors: Dale B. Stepps, Fort Lauderdale, FL (US); Jose Luis Suarez, Pembroke Pines, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,842

(22) Filed: Feb. 4, 2014

Related U.S. Application Data

(63) Continuation-in-part of application No. 13/188,147, filed on Jul. 21, 2011, now Pat. No. 8,643,300.

(51) Int. Cl.
  *H05B 37/02* (2006.01)
  *H05B 33/08* (2006.01)

(52) U.S. Cl.
  CPC .................................. *H05B 33/0812* (2013.01)

(58) Field of Classification Search
  CPC ............... H05B 37/02; H05B 37/0245; H05B 33/0839; H05B 33/0842; G05F 1/00
  USPC ......... 315/291, 294, 247, 224, 308, 312, 129, 315/131; 340/815.45, 332; 362/249.02, 373
  See application file for complete search history.

(56) References Cited

U.S. PATENT DOCUMENTS

| | | |
|---|---|---|
| 60,004 A | 12/1921 | Adam |
| 78,750 A | 6/1929 | Gunnison |
| D129,357 S | 9/1941 | Greppin |
| D132,276 S | 5/1942 | Greppin |
| D143,336 S | 12/1945 | Morrison |
| D150,357 S | 7/1948 | Herbster |
| D155,680 S | 10/1949 | Baker |
| D164,606 S | 9/1951 | Schlage |
| D234,797 S | 4/1975 | De John et al. |
| D303,437 S | 9/1989 | Mason |
| D339,651 S | 9/1993 | Vieyra |
| D365,159 S | 12/1995 | Tinen |
| D385,897 S | 11/1997 | Lin |
| 5,738,436 A | 4/1998 | Cummings et al. |
| D397,482 S | 8/1998 | Binsukor |
| D405,216 S | 2/1999 | Porter et al. |
| D413,137 S | 8/1999 | Lin |
| 6,013,988 A | 1/2000 | Bucks et al. |
| 6,094,014 A | 7/2000 | Bucks et al. |
| 6,147,458 A | 11/2000 | Bucks et al. |

(Continued)

FOREIGN PATENT DOCUMENTS

| | | |
|---|---|---|
| WO | WO 2009/064433 | 5/2009 |
| WO | WO 2009/064434 | 5/2009 |

*Primary Examiner* — Haiss Philogene
(74) *Attorney, Agent, or Firm* — Malloy & Malloy, P.L.

(57) ABSTRACT

A control system and method for automatically and seamlessly providing optimal power and/or voltage levels to an integrated, connected or other designated light assembly. In particular, the control system comprises corresponding boost, buck and feedback circuitry cooperatively utilized to intelligently increase, decrease or maintain the signal or power delivered to the light assembly at an optimal level, thereby increasing efficiency and productivity of the light assembly and allowing the light assembly to operate even in the event of a severely degraded signal due to resistance or impedance resulting from a lengthy power wire or other factors.

15 Claims, 5 Drawing Sheets

(56) References Cited

U.S. PATENT DOCUMENTS

| | | |
|---|---|---|
| 6,160,359 A | 12/2000 | Fleischmann |
| 6,188,177 B1 * | 2/2001 | Adamson et al. ............. 315/149 |
| 6,234,645 B1 | 5/2001 | Borner et al. |
| 6,234,648 B1 | 5/2001 | Borner et al. |
| 6,250,774 B1 | 6/2001 | Begemann et al. |
| 6,304,464 B1 | 10/2001 | Jacobs et al. |
| 6,375,338 B1 | 4/2002 | Cummins et al. |
| 6,388,388 B1 | 5/2002 | Weindorf et al. |
| 6,472,828 B1 | 10/2002 | Pruett et al. |
| D469,211 S | 1/2003 | Homann |
| 6,561,690 B2 | 5/2003 | Balestriero et al. |
| 6,577,512 B2 | 6/2003 | Tripathi et al. |
| 6,586,890 B2 | 7/2003 | Min et al. |
| 6,608,617 B2 | 8/2003 | Hoffknecht et al. |
| 6,617,795 B2 | 9/2003 | Bruning |
| 6,642,674 B2 | 11/2003 | Liao et al. |
| 6,692,136 B2 | 2/2004 | Marshall et al. |
| D490,182 S | 5/2004 | Benensohn |
| D493,188 S | 7/2004 | Brueck |
| 6,856,890 B2 | 2/2005 | Muto et al. |
| 6,922,022 B2 | 7/2005 | Bucks et al. |
| D509,016 S | 8/2005 | Benghozi |
| 6,972,525 B2 | 12/2005 | Bucks et al. |
| 6,975,079 B2 | 12/2005 | Lys et al. |
| 7,038,399 B2 | 5/2006 | Lys et al. |
| 7,129,933 B1 | 10/2006 | Nishikawa et al. |
| 7,183,727 B2 | 2/2007 | Ferguson et al. |
| 7,186,000 B2 | 3/2007 | Lebens et al. |
| 7,202,608 B2 | 4/2007 | Robinson et al. |
| 7,233,115 B2 | 6/2007 | Lys |
| 7,252,385 B2 | 8/2007 | Engle et al. |
| 7,256,554 B2 | 8/2007 | Lys |
| 7,262,559 B2 | 8/2007 | Tripathi et al. |
| D550,391 S | 9/2007 | Cesaro |
| D554,974 S | 11/2007 | Huang |
| D556,075 S | 11/2007 | Teiber et al. |
| 7,329,024 B2 | 2/2008 | Lynch et al. |
| 7,348,736 B2 | 3/2008 | Piepgras et al. |
| 7,352,138 B2 | 4/2008 | Lys et al. |
| 7,358,681 B2 | 4/2008 | Robinson et al. |
| 7,358,706 B2 | 4/2008 | Lys |
| 7,394,212 B2 * | 7/2008 | Wey et al. ...................... 315/291 |
| 7,420,335 B2 | 9/2008 | Robinson et al. |
| 7,459,864 B2 | 12/2008 | Lys |
| D591,448 S | 4/2009 | Huang |
| 7,522,615 B2 | 4/2009 | Binder |
| D592,347 S | 5/2009 | Trott et al. |
| D592,348 S | 5/2009 | Trott et al. |
| 7,557,521 B2 | 7/2009 | Lys |
| D602,193 S | 10/2009 | Soderman et al. |
| D602,195 S | 10/2009 | Soderman et al. |
| D604,008 S | 11/2009 | Soderman et al. |
| 7,722,227 B2 | 5/2010 | Zhang et al. |
| 7,737,643 B2 | 6/2010 | Lys |
| 7,760,107 B1 | 7/2010 | Stepps et al. |
| 7,802,902 B2 | 9/2010 | Moss et al. |
| 7,810,960 B1 | 10/2010 | Soderman et al. |
| 7,878,692 B2 | 2/2011 | Soderman et al. |
| 7,980,736 B2 | 7/2011 | Soderman et al. |
| 8,360,614 B2 | 1/2013 | Soderman et al. |
| 8,531,226 B2 | 9/2013 | Montalbo et al. |
| 8,534,873 B1 | 9/2013 | Soderman et al. |
| 8,643,300 B1 * | 2/2014 | Stepps et al. ................... 315/291 |
| 2003/0102845 A1 | 6/2003 | Aker et al. |
| 2005/0213047 A1 | 9/2005 | Slobodin et al. |
| 2006/0126328 A1 | 6/2006 | Coushaine |
| 2007/0139923 A1 | 6/2007 | Negley et al. |
| 2007/0223230 A1 | 9/2007 | Trojanowski et al. |
| 2007/0242461 A1 | 10/2007 | Reisenauer et al. |
| 2007/0279821 A1 | 12/2007 | Sells |
| 2009/0109052 A1 | 4/2009 | Stepps et al. |
| 2009/0122553 A1 | 5/2009 | Soderman et al. |
| 2009/0195168 A1 | 8/2009 | Greenfeld |
| 2009/0278479 A1 | 11/2009 | Platner et al. |
| 2009/0303602 A1 | 12/2009 | Bright et al. |
| 2010/0134038 A1 | 6/2010 | Shackle et al. |
| 2010/0271178 A1 | 10/2010 | Ahmad |
| 2011/0012530 A1 | 1/2011 | Zheng et al. |
| 2011/0095703 A1 | 4/2011 | Wilson et al. |

\* cited by examiner

POWER CONTROL SYSTEM AND METHOD FOR PROVIDING AN OPTIMAL POWER LEVEL TO A DESIGNATED LIGHT ASSEMBLY

CLAIM OF PRIORITY

The present application is a continuation-in-part application of previously filed, now pending application having Ser. No. 13/188,147, filed on Jul. 21, 2011 incorporated herein by reference.

BACKGROUND OF THE INVENTION

1. Field of the Invention

The present invention is generally directed to a control system and method for automatically and seamlessly providing optimal power to an integrated, connected or other designated light assembly. In particular, the control system comprises intelligent boost, buck and feedback circuitry cooperatively utilized to intelligently increase, decrease or maintain the signal or power delivered to the light assembly at an optimal level, thereby increasing efficiency and productivity of the light assembly and allowing the light assembly to operate even in the event of a severely degraded signal due to resistance resulting from a lengthy power wire or other factors.

2. Description of the Related Art

Oftentimes, the power level and/or voltage level that reaches or is otherwise feeding a light fixture is less than optimal. In particular, the voltage feeding a light fixture is, in many cases, either too high or too low as compared to a predetermined optimal or minimal level. For instance, a light fixture that needs twenty volts to operate in its maximum or intended fashion will typically receive voltage levels well in excess of that or, in some instances, much less. In particular, due to a number of various factors, including, for example, natural impedance or resistance of the signal as a result of the particular gauge or quality of wire used, the length of wire used, and/or due to other devices drawing power or creating resistance on the line, the power or voltage level that ultimately reaches the light fixture may be exceptionally lower than the optimal range or level for which the particular light fixture is designed to operate.

In the case of an incandescent light fixture, with a lower than optimal signal level, the incandescent light bulb(s) will generally light up via the partially heated filament, but may not reach or otherwise output a maximum or optimal level of light. In the case of an LED light fixture, if the input voltage level is below a particular level or minimum threshold, the LED(s) will not power on and therefore will not emit any light.

Similarly, in the event the light fixture receives a level of power or voltage that is exceptionally higher than the optimal level needed by the designated light assembly to operate in its maximum intended fashion, then too much power is generated or consumed and the efficiency of the entire circuit decreases. Of course, the cost of energy increases and the life expectancy of the light fixtures may significantly decrease.

Accordingly, there is a need in the art for a control system that is capable of receiving an input and manipulating the signal to correspond to an optimal level for the corresponding light fixture. In order to be flexible, integrated with virtually any light fixture and positioned virtually anywhere relative to an input power source, the control assembly may comprise a feedback signal from the light fixture which is capable of signifying whether the output signal is too high, too low, or at an optimal level. Such a control system will thus allow a light fixture to be positioned a great distance from the power source without sacrificing functionality by receiving a degraded signal and intelligently increasing its voltage to an optimal level. Additionally, the control system can be used to decrease the voltage or power from an excessive level to a lower, optimal level, thereby conserving energy and being efficient.

SUMMARY OF THE INVENTION

The present invention is generally directed to a control system and method for delivering optimal voltage or power to a designated light assembly. In particular, the control system of at least one embodiment comprises a voltage manipulation assembly including, for example, a boost converter and a buck converter which are respectively structured to increase and decrease the voltage levels on a signal. In order for the voltage manipulation assembly to determine whether the signal should be increased or decreased, a feedback signal is employed to signify whether the output signal transmitted from the voltage manipulation assembly to the light assembly was at an optimal level.

In particular, an optimal light fixture voltage comprises a minimum amount of voltage or power needed by the particular light assembly in order to operate in its maximum intended fashion. Of course, the optimal light fixture voltage will vary depending upon the particular light assembly and/or the illumination source associate therewith. More specifically, the minimum amount of voltage or power needed by a given light assembly will be at least partially dependent on whether the illumination source associated with the light assembly comprises LED's, incandescent light bulbs, fluorescent lights, etc. Accordingly, it is emphasized that the term "light assembly" and/or "light fixture", as used herein, is meant to include reference to an illumination source such as, but not limited to, one or more of the illumination sources set forth above.

The feedback signal of at least one embodiment of the present invention comprises a voltage equal to the output voltage minus the voltage consumed by the light assembly. Thus, in such an embodiment, the optimal output signal comprises a voltage equal or substantially equal to the optimal light fixture voltage plus an optimal feedback voltage, which, when transmitted back to the voltage manipulation assembly, is capable of signifying that the output signal was in fact at an optimal level.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3 is a schematic representation of an exemplary implementation of a plurality of light assemblies positioned in an area intended to be illuminated, such as a building or the like.

Like reference numerals refer to like parts throughout the several views of the drawings.

DETAILED DESCRIPTION OF THE PREFERRED EMBODIMENT

Figure 1:
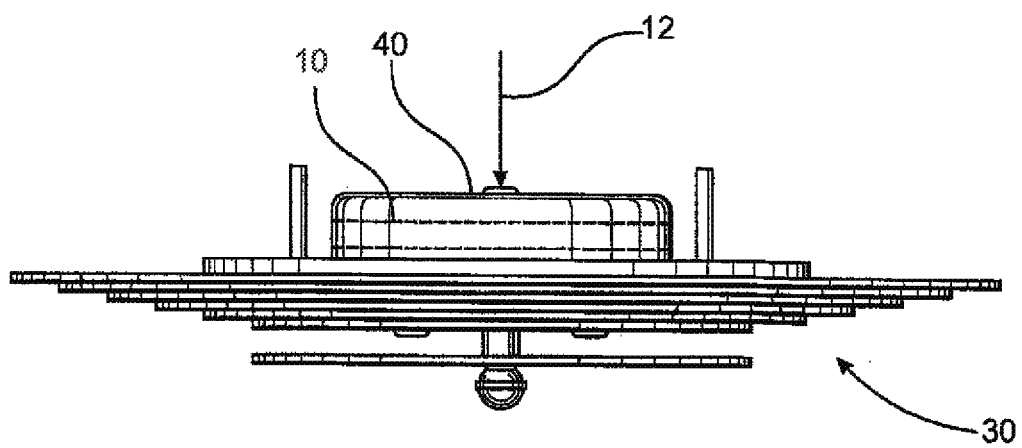
FIG. 1 is an elevation view of an exemplary light assembly and control system of at least one embodiment of the present invention.
Figure 2:
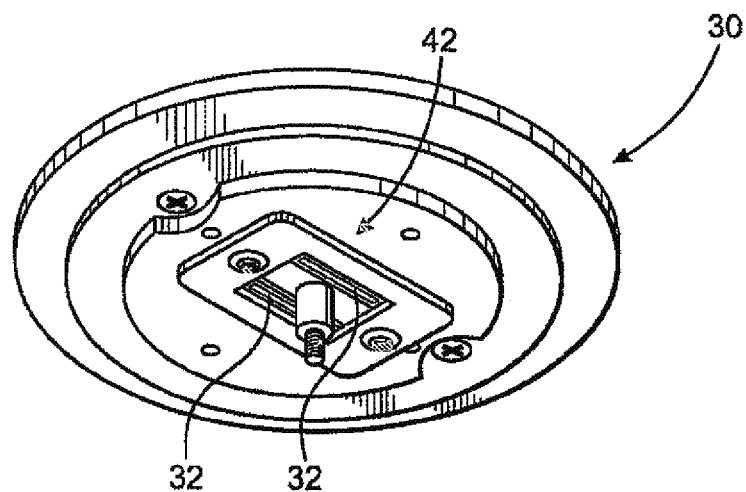
FIG. 2 is a bottom perspective view of the exemplary light assembly illustrated in FIG. 1.

As shown in the accompanying figures, and with particular reference to FIGS. 1 and 2, the present invention is directed to a power and/or voltage control system, generally referenced as 10, comprising appropriate control circuitry which is operatively structured to provide optimal power to one or more designated, integrated or attached light assemblies 30. In particular, as illustrated in FIGS. 1 and 2 the control system 10 and/or control circuitry of the various embodiments of the present invention may be fixedly integrated or housed with the light assembly 30 by virtue of sharing a common housing 40, control board 42, and/or other circuitry; however, it is contemplated that the control system 10 comprises a separate structure that may be electrically interconnected to one or more designated light assemblies 30 via appropriate wires, cables, circuitry, etc., as will be described here.

Furthermore, the light assembly 30 of the various embodiments of the present invention preferably comprises one or more light fixtures embodying and illumination source including at least one, but preferably a plurality of light emitting diodes (LED's), generally referenced at 32 in FIG. 2. One or more LED's are advantageous particularly due to the low voltage requirements, compact size, narrow bandwidth, high efficiency, and reliability associated therewith. However, it should be noted that the control system 10 of at least one embodiment may function with or otherwise be used in conjunction with virtually any lighting assembly 30 including, but not limited to, light fixtures employing an illumination source comprising incandescent light bulbs, fluorescent tubes, neon strips, or other illuminating structures.

Oftentimes, the power level or voltage that reaches the light assembly 30, for instance, via a power source 13 or electrical input line 12 has a less than optimal level of power or voltage, which may be either high or low as compared to a predetermined optimal power level, as will be described in greater detail below. By way of example, the power source input line 12 may comprise a conventional one hundred and twenty (120) volt alternating current ("AC") input line, a direct current ("DC") input line, or other electrical power lines extending from, for example, a circuit breaker or power source 13. In particular, due to a number of various factors, including, for example, natural impedance or resistance of the signal as a result of the particular wire used, the length of wire used, and/or due to other devices drawing power or creating resistance on the line, the power or voltage level that ultimately reaches the light assembly 30 may be lower than the optimal range or level for which the particular light assembly 30 is designed to run.

In the case of an incandescent light assembly, the incandescent light bulb(s) will generally light up via the partially heated filament, but may not reach or otherwise output a maximum or optimal level of light. In the case of an LED light, if the input voltage level is below a particular level, the LED(s) will not power on and therefore will not emit any light. Similarly, in the event the input line 12 comprises a level of power or voltage that is higher than the optimal level needed by the designated light assembly 30, then too much power is generated and the efficiency of the entire circuit decreases.

As such, an optimal light fixture voltage, as used herein, comprises a minimum amount of voltage or power that is required to operatively control or power the light assembly in a manner such that the light assembly 30 may function in its maximum intended operative fashion and/or full capacity and without being excessively wasteful. Thus, the optimal voltage or level in each application of the present invention may vary depending upon the particular light assembly 30 utilized. For example, the optimal voltage for an incandescent light assembly is normally much higher than the optimal voltage for an LED light assembly. Accordingly, the predetermined optimal level for various light assemblies 30 connected to one another or otherwise sharing a common power source or distributed throughout a common room, building, auditorium, etc., may be different.

Figure 3:
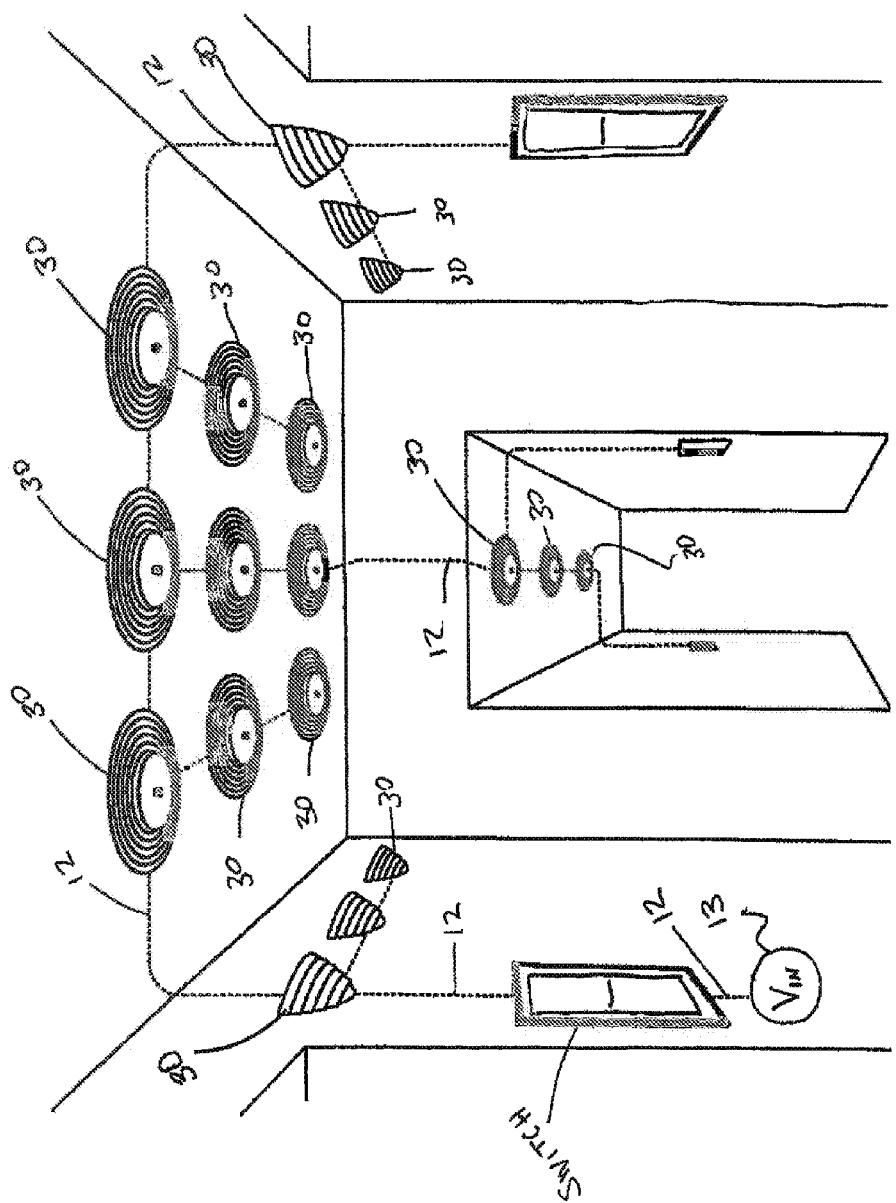

For exemplary purposes only, and referring to the illustration provided in FIG. 3, in the event the light assembly 30 is positioned a great distance from the original power source 13, for instance, across a large room, building, house, auditorium or stadium, the signal may degrade along the way to the light assembly 30 which may then receive a lower than optimal power or voltage level.

Figure 4A:
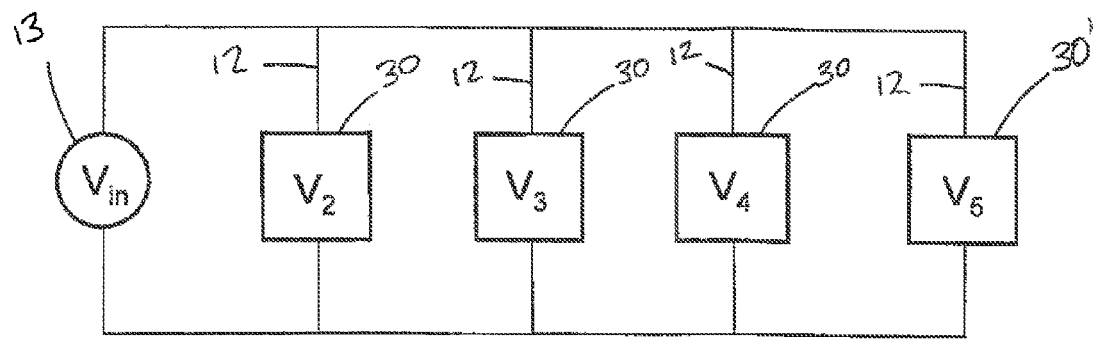
FIG. 4A is an exemplary schematic illustration of a plurality of light assemblies connected in parallel to one another.

Referring now to the simplified schematic representation of FIG. 4A, light assemblies 30 may, but need not necessarily, be disposed or otherwise wired in parallel with one another and with power source 13. In this example, power source 13 comprises voltage V1, and in an unrealistic situation where the connection wires 12 include no resistance, the voltage at the farthest light assembly 30' from power source 13 comprises a voltage V5 which is equal, or substantially equal, to V1. Of course, however, the wires connecting the power source 13 and each of the light assemblies 30 to one another include a natural resistance, which can be significant, especially over great distances and depending on the quality of wire used. Accordingly, voltage V5 will naturally be less than voltage V1, and in some situations much less. Because of the degradation of the signal over the length of wire 12, voltage V5 may be lower than an optimal voltage in that light assembly 30' may not operate in its intended, optimal or maximum fashion.

However, it is also possible that even with the degradation over the connection line 12, the voltage or signal at V5 may be higher than an optimal level to power or run the light assembly 30'. In such a case, although the light assembly 30' may function in its intended fashion, the power level or signal at V5 is less than efficient, and therefore, not optimal. Of course, the voltages V2, V3, and V4 may also be less than optimal in that the voltages may either be higher or lower than a predetermined optimal level associated with the particular light assembly 30.

Figure 4B:
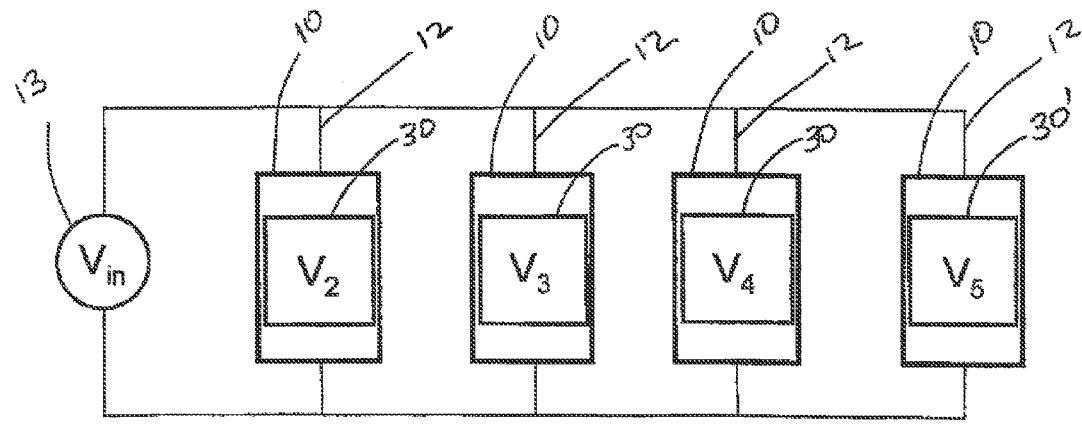
FIG. 4B is an exemplary schematic illustration of a plurality of light assemblies and corresponding control systems connected to one another.
Figure 5:
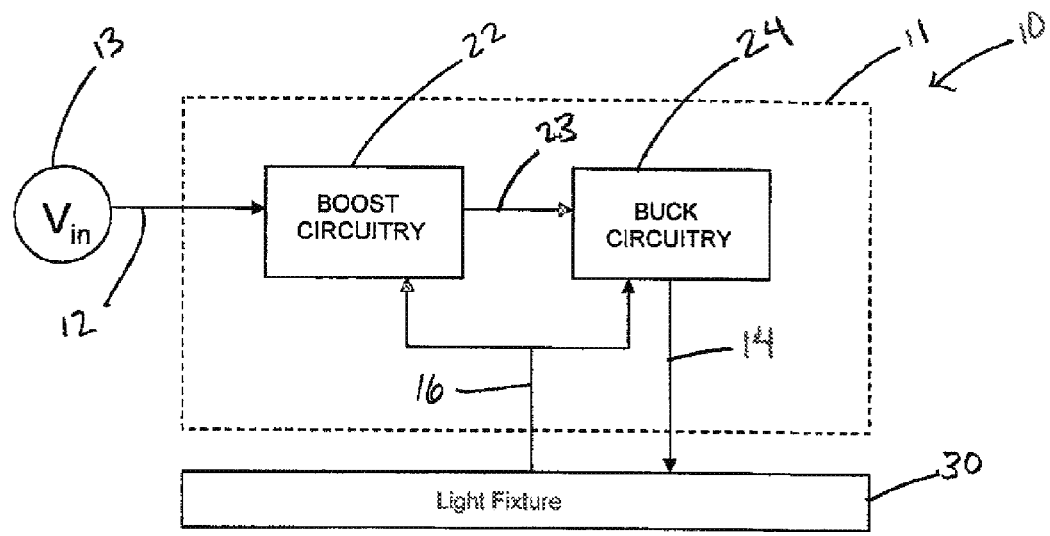
FIG. 5 is a schematic representation of at least one embodiment of the control assembly as disclosed in accordance with the present invention.
Figure 6:
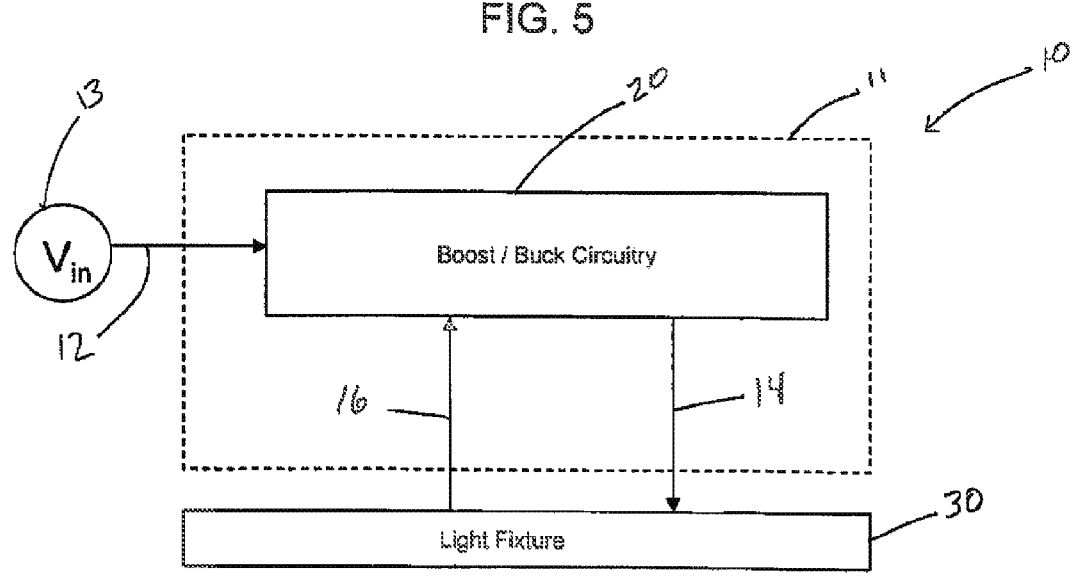
FIG. 6 is a schematic representation of yet another embodiment of the control assembly of the present invention.

Accordingly, as generally and schematically shown in FIG. 4B, at least one embodiment of the present invention comprises a control system 10 connected to or integrated with one or more of the light assemblies 30, 30'. In particular, referring now to FIGS. 5 and 6, the control system 10 of the various embodiments of the present invention comprises a voltage manipulation assembly, generally referenced at 11. Specifically, the voltage manipulation assembly 11 is electrically interconnected between the power source 13 (either directly, in parallel, or series through other light assemblies) via a power source input line 12 and the light assembly 30 via a light assembly input line 14. More in particular, the power source or electrical input line 12 and the light assembly input line 14 may comprise any electrical interconnection or wire capable of implementing the present invention in the intended fashion.

Moreover, the voltage manipulation assembly 11 of the present invention is structured and configured to receive an input signal from the power source 13, via the input line 12 and transmit an output signal to the light assembly 30 via the light assembly input line 14. As will become apparent from the disclosure herein, the input and output signals comprise electrical signals traveling through the corresponding lines, and thus each signal includes a voltage and a current.

Moreover, in at least one embodiment of the present invention the voltage manipulation assembly 11 comprises a boost/buck assembly 20, including a boost converter and/or circuitry 22 and a corresponding buck converter and/or circuitry 24. As generally illustrated in FIG. 1, the boost and buck converters 22,24 of the voltage manipulation assembly 11 may comprise separate structures, chips, devices, etc., which are electrically interconnected to one another via a connection wire 23. However, in yet another embodiment, the boost and buck converters 22,24 comprise a single structure, chip, device, etc. In any event, and as will become apparent from the following discussion, the voltage manipulation assembly 11 is cooperatively structured to convert or otherwise manipulate the voltage or power on the input line 12 in order to deliver an optimal voltage level to the designated light assembly 30, as necessary. The voltage manipulation assembly 11 is structured to output the converted or manipulated signal onto an intermediate input line or light assembly input line 14 which is electrically connected to the light assembly 30 and cooperatively structured to provide power or voltage thereto.

In addition, the control system 10 of the present invention comprises a feedback signal line 16 electrically interconnected between the voltage manipulation assembly 11 and the light assembly 30. In particular, the feedback signal line 16 is structured to carry or transmit a feedback signal to the voltage manipulation assembly 11. The feedback signal is operatively structured to signify or indicate whether the output signal transmitted onto the light assembly input line 14 comprises an optimal output signal. As will become apparent from the discussion herein, an optimal output signal, as used herein, comprises a voltage equal or substantially equal to the optimal light fixture voltage plus an optimal feedback signal voltage. Specifically, the voltage manipulation assembly 11 is structured to receive and analyze the feedback signal via the feedback signal line 16, and based thereupon, manipulate the voltage or power delivered to the light assembly 30. For instance, depending upon the status of the output signal reported by the feedback signal, the voltage manipulation assembly 11 is structured to increase the voltage (via the boost converter 22) or decrease the voltage (via the buck converter 24).

Specifically, in at least one embodiment, the feedback signal comprises a voltage substantially equal to the output voltage transmitted from the voltage manipulation assembly 11 on the light assembly input line 14 minus the voltage utilized by the light assembly or light assembly 30. In a preferred embodiment, the voltage manipulation assembly 11 receives the feedback signal, and generates a modified or manipulated output signal based thereupon via the boost and/or buck converters 22,24 and transmits the manipulated output signal to the light assembly 30 via the light assembly input line 14. Then again, the feedback signal line 16 will carry another feedback signal to the voltage manipulation assembly 11, which again, analyzes the feedback signal, and if necessary, generates another modified output signal. In particular, the voltage manipulation assembly 11 will generate modified output signals at least until the feedback signal received and analyzed thereby comprises an optimal feedback signal.

Specifically, an optimal feedback signal, as used herein, signifies to the voltage manipulation assembly 11 that the voltage or signal transmitted to the light assembly is or was an optimal output signal in that it meets the minimal voltage and/or other power or signal requirements associated with the light assembly 30 and is not in excess of the optimal levels. In such a case, the light assembly 30 is able to function in its intended manner and the signal transmitted thereto is not excessive or wasteful. In particular, the optimal feedback signal may be a predetermined signal or voltage level that the voltage manipulation assembly 11 is capable of recognizing upon receipt and analysis of the same.

In other embodiments, the optimal feedback signal comprises a minimum voltage or power structured to power or run a portion of the voltage manipulation assembly 11, such as the buck converter 24. Accordingly, if the buck converter 24 is not powered or is underpowered, the boost converter 22 will function to increase the voltage or signal on the light assembly input line 14 at least until the buck converter is powered. Conversely, if the buck converter 24 is overpowered, the buck converter 24 will function to decrease the voltage or signal on the light assembly input line 14 at least until the buck converter 24 receives a predetermined optimal or minimal power or voltage level.

Accordingly, in at least one embodiment, if the feedback signal comprises a voltage or power level that is less than the optimal feedback signal, the voltage manipulation assembly 11, and in particular, the boost converter 22 thereof, will incrementally increase the voltage or power level of the output signal on the light assembly input line 14, for example, by one (1) volt. This will occur repetitively or incrementally until the feedback signal is at an optimal level. In addition, if the feedback signal comprises a voltage or power level that is greater than the optimal feedback signal, the voltage manipulation assembly 11, and in particular, the buck converter 24 thereof, will incrementally decrease the voltage or power lever on the light assembly input line 14, for example, by one (1) volt. Similarly, this will occur repetitively or incrementally until the feedback signal comprises an optimal level.

For exemplary purposes only, and to illustrate the functions of certain structures of the present invention, in at least one exemplary implementation, the buck converter 24 may require a minimum of four (4) volts to function properly and a corresponding light assembly 30 may require a minimum of twenty (20) volts to function properly or otherwise in its intended manner. Thus, the optimal feedback signal of such an example is four (4) volts, and the optimal output signal is twenty four (24) volts (the optimal voltage for the light assembly 30 plus the optimal feedback signal). If, for example, the input signal on the electrical input line 12 comprises eighteen (18) volts, the initial signal will pass through the voltage manipulation assembly 11 or otherwise directly to the light assembly 30. Because the light assembly 30 requires a minimum of twenty (20) volts, the feedback signal will be zero (e.g., the voltage received or consumed by the light assembly 30 (18V) minus the voltage utilized by the light assembly (18V)). In such a case, the feedback signal is less than the optimal feedback signal (which in this example is four (4) volts needed to power the buck converter), and therefore, the boost converter 22 is structured to increase the voltage, for example, incrementally by one (1) volt. In particular, for the second or next pass, the signal transmitted to the light assembly 30 via the light assembly input line 14 comprises nineteen (19) volts (18V+1V). Again, the feedback signal comprises zero (0) volts, and therefore, the boost converter 22 will increase the voltage by one (1) volt again. On the third or next pass, the voltage transmitted by the signal to the light assembly 30 comprises twenty (20) volts (19V+1V). Twenty (20) volts is the minimum amount or optimal level needed by the light assembly 30, and although the light assembly 30 will now function properly, the feedback signal is still zero (0) and less than optimal. Accordingly, the boost converter 24 will again increase the voltage by one (1) volt. On the next pass, the voltage transmitted to the light assembly 30 comprises twenty one (21) volts (20V+1V). Now, the feedback signal comprises one (1) volt, but is still not enough to power the buck converter 24. The procedure will continue until the voltage transmitted by the voltage manipulation assembly 11 to the light assembly 30 via the light assembly input line 14 comprises twenty four (24) volts. In such an instance, the feedback signal comprises four (4) volts, which is the minimum needed to operate or power the buck converter 24. This signifies to the voltage manipulation assembly 11 that the output signal is now at an optimal level and no increasing or decreasing is necessary.

Similarly and still referring to the exemplary optimal voltage levels identified above, if the initial input signal on the electrical input line 12 comprises twenty six (26) volts, the initial signal will pass through the voltage manipulation assembly 11 or otherwise directly to the light assembly 30. Because the light assembly 30 requires a minimum or optimal twenty (20) volts to operate, the feedback signal will comprise six (6) volts (e.g., the voltage received by the light assembly 30 (26V) minus the voltage utilized by the light assembly 30 (20V)). In such a case, the feedback signal is greater than the optimal feedback signal (which in this example is four (4) volts needed to power the buck converter 24), and therefore, the buck converter 24, which is powered, is structured to decrease the voltage, for example, incrementally by one (1) volt. For the next pass, the signal transmitted to the light assembly 30 via the light assembly input line 14 will thus comprise twenty five (25) volts (26V-1V). The feedback signal will correspondingly comprises five (5) volts, and therefore, the buck converter 24 will again decrease the voltage by one (1) more volt. On the next pass, the voltage transmitted by the signal to the light assembly 30 comprises twenty four (24) volts (25V-1V). Again, twenty (20) volts is the amount needed and consumed by the light assembly 30. Thus, the feedback signal will comprises the optimal four (4) volts in this example. This will signify to the voltage manipulation assembly 11 that the output signal is at an optimal level and the voltage manipulation assembly 11 will maintain the signal at such level.

Of course, in certain implementations of the present invention, the voltage level and/or signal is constantly fluctuating up and down, and therefore, the voltage manipulation assembly 11 continues to control the voltage or signal levels via the boost converter 22 and/or the buck converter 24 in the manner described herein.

It is also contemplated that in at least one embodiment, the voltage manipulation assembly 11 may learn or remember optimal levels associated with the corresponding light assembly 30. In such a case, once the voltage manipulation assembly 11 manipulates the output signal to the optimal level, it remembers that optimal value, voltage or signal. Accordingly, upon the occurrence of future fluctuations of the input signal, the voltage manipulation assembly 11 may automatically manipulate the output signal to the optimal level rather than incrementally manipulating it, as described in the example provided herein.

Furthermore, in yet another embodiment, the optimal signal levels may be pre-defined or pre-programmed into the voltage manipulation assembly 11. Accordingly, in such an embodiment, the boost and buck converters 22,24 do not need to incrementally increase or decrease the voltage or signal, and may instead automatically convert or manipulate the voltage to the pre-programmed optimal levels on one pass.

Figure 7:
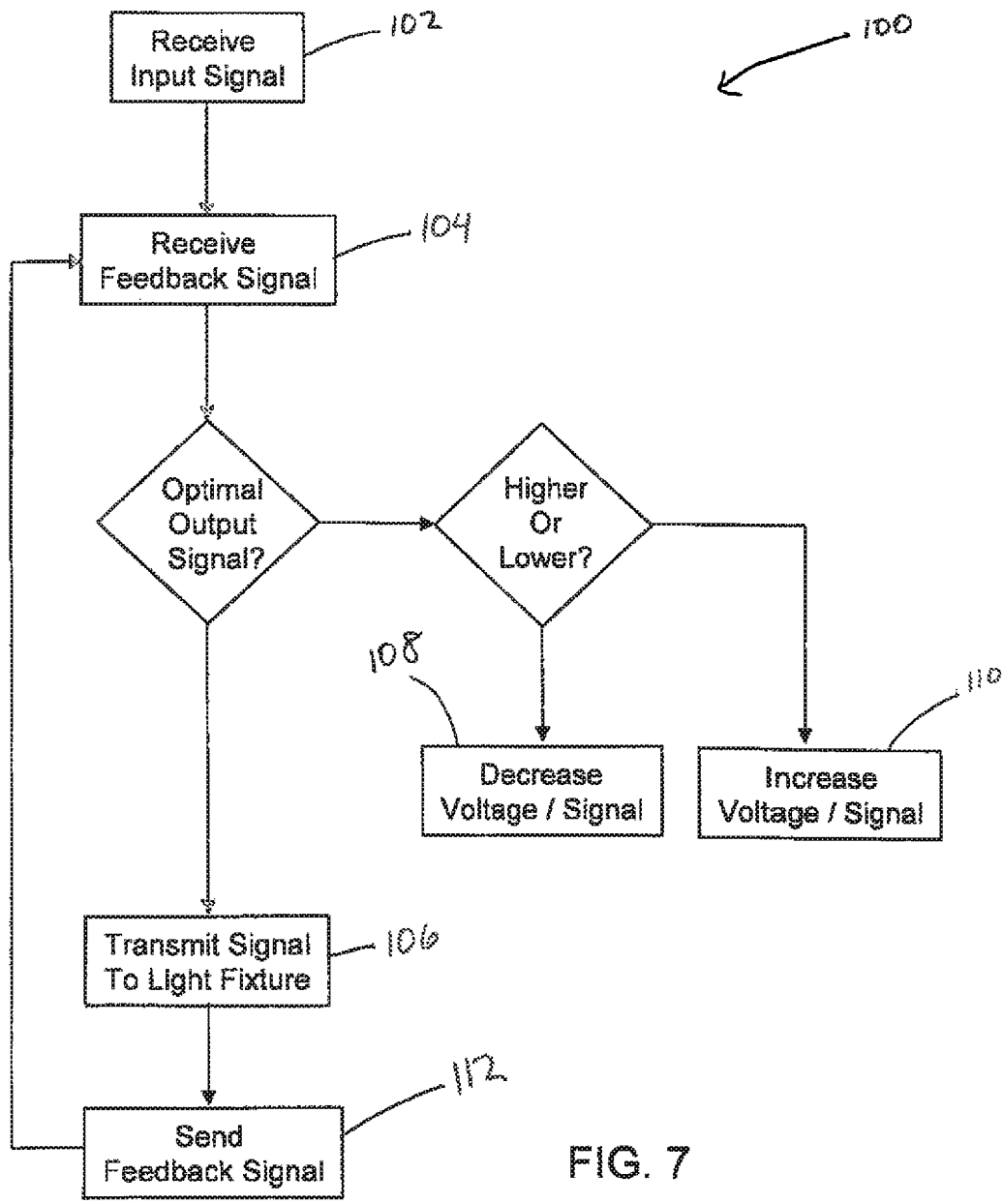
FIG. 7 is a high level flow chart of the method as disclosed in accordance with at least one embodiment of the present invention.

Referring now to the flowchart of FIG. 7, the present invention further comprises a method 100 for providing optimal voltage to the light assembly 30 by virtue of implementing the various structures and circuitry as described in detail herein. Specifically, the present invention includes receiving an input signal, generally referenced at 102. In particular, the signal or voltage manipulation assembly 11 receives an input signal on an electrical input line 12, for example, from a power source 13 (either directly, in parallel, series, etc.).

Furthermore, as mentioned above and as illustrated at 104 in FIG. 7, the method comprises receiving a feedback signal, for instance from the light assembly 30 via a feedback signal line 16. In particular, the feedback signal is structured to signify to the voltage manipulation assembly 11 whether the output signal transmitted to the light assembly 30 was lower, equal to, or higher than an optimal signal, as described above. If the output signal is optimal, then the control assembly 10 maintains the signal at its optimal level and transmits it to the light assembly 30, as at 106. If however, the output signal is not optimal, then the voltage manipulation assembly 11 must either decrease as at 108 or increase as at 110, the voltage and transmit the manipulated (i.e., decreased or increase) signal as at 106 to the light assembly 30. The feedback signal is again sent back as at 112 to the voltage manipulation assembly 11 where it is again received and analyzed in the same manner.

Ultimately, the control system 10 and method 100 transmits an optimal signal comprising an optimal voltage level to the corresponding light assembly. In doing so, a significant amount of energy is saved in that excessive amounts of energy above the optimal level are not used, and also, light assemblies positioned a great distance from the power source or light assemblies positioned at a location with a signal lower than an optimal level needed to fully operate the light assembly can be fed a manipulated signal with increased power or voltage allowing the light assembly to in fact function in its fully intended or maximum operation. In at least one embodiment, however, it should be noted that in order for the voltage manipulation assembly 11 to operate, the electrical input line 12 must have a minimum amount of power or voltage to operate the boost circuitry thereof. However, in many instances, the minimum voltage or power needed to operate the boost circuitry is rather insignificant (e.g., approximately eight volts), and thus, the present invention is intended to operate in virtually any location, even those receiving minimal or insignificant voltage levels.

It should be understood from the discussion presented above that the control system 10 and method 100 of the various embodiments can be easily integrated and positioned at virtually any location throughout a building or site without the need to pre-adjust or pre-designate optimal values. In particular, the feedback signal is designed and operative to dynamically, automatically, and seamlessly "teach" or signify to the system whether the output signal is optimal.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method for providing optimal voltage to a light assembly comprising:
    receiving an input signal comprising a voltage from an electrical power source and transmitting an output signal to the light assembly,
    receiving a feedback signal from the light assembly, the feedback signal being structured to indicate a status of the output signal in relation to an optimal output signal,
    manipulating an output voltage based on the received feedback signal,
    defining manipulating the output voltage as either incrementally increasing or incrementally decreasing the output voltage as needed, until the feedback signal indicates the output voltage is substantially equal to the optimal output voltage, and
    transmitting the manipulated output voltage to the light assembly.

2. The method as recited in claim 1 further comprising defining the optimal output voltage as comprising an optimal light fixture voltage plus an optimal feedback voltage.

3. The method as recited in claim 1 comprising manipulating the output voltage by implementing a boost converter to incrementally increase the feedback signal and implementing a buck converter to incrementally increase the feedback signal.

4. The method as recited in claim 3 further comprising defining the optimal feedback voltage as comprising a minimum amount of power required to operatively power the buck converter.

5. The method as recited in claim 4 further comprising defining the optimal light fixture voltage as comprising a minimum operative power to operate the light assembly.

6. A power control system electrically interconnected to a light assembly, said power control system comprising:
    a voltage manipulation assembly structured to receive an input signal from an electrical power source and transmit an output signal to the light assembly,
    said voltage manipulation assembly structured to receive a feedback signal; said feedback signal indicative of a status of said output signal in relation to an optimal output signal,
    a feedback signal carrier disposed in operative communication between said voltage manipulation assembly and the light assembly, said feedback signal carrier being structured to transmit a feedback signal to said voltage manipulation assembly, and
    said voltage manipulation assembly further structured to generate a manipulated output signal based on said feedback signal and transmit said manipulated output signal to the light assembly.

7. The system as recited in claim 6 wherein said manipulated output signal is operative to implement an incremental increase or an incremental decrease in an output voltage sufficient to establish said feedback signal being indicative of said output voltage being substantially equivalent to an optimal output voltage.

8. The system as recited in claim 7 wherein said voltage manipulation assembly is structured and configured to analyze said feedback signal and thereby implement said incremental increase or incremental decrease of said output voltage until said feedback signal indicates that said output voltage is substantially equal to an optimal output voltage.

9. The system as recited in claim 7 wherein said optimal output voltage comprises an optimal light fixture voltage plus an optimal feedback voltage.

10. The system as recited in claim 9 wherein said optimal feedback voltage comprises a predetermined minimum voltage structured to operatively power at least a portion of said voltage manipulation assembly.

11. The system as recited in claim 9 wherein said optimal light fixture voltage comprises a predetermined minimum voltage structured to operatively power the light assembly.

12. The system as recited in claim 6 wherein said voltage manipulation assembly comprises a boost converter and a buck converter.

13. The system as recited in claim 12 wherein said optimal feedback voltage comprises a predetermined minimum voltage structured to operatively power said buck converter.

14. The system as recited in claim 13 wherein said feedback signal comprises a voltage substantially equal to said output voltage minus a voltage utilized by the light assembly.

15. A system as recited in claim 12 wherein said feedback signal comprises a voltage substantially equal to said output voltage minus a voltage utilized by the light assembly.

* * * * *